United States Patent

Roemke et al.

[11] Patent Number: 4,719,138
[45] Date of Patent: Jan. 12, 1988

[54] RADIANT HEAT RESISTANT STENCILIBLE INFLATABLE FABRIC AND METHOD

[75] Inventors: Lowell W. Roemke, Wadsworth; Hildreth W. Stevenson, Medina, both of Ohio

[73] Assignee: The B. F. Goodrich Company, Akron, Ohio

[21] Appl. No.: 866,656

[22] Filed: May 27, 1986

[51] Int. Cl.⁴ .............................................. B32B 3/00
[52] U.S. Cl. ...................................... 428/72; 428/101; 428/166; 428/178; 428/188; 428/192; 428/246; 428/247; 428/285; 428/457
[58] Field of Search ............... 428/224, 247, 246, 166, 428/178, 188, 192, 72, 101, 198, 285, 457

[56] References Cited

U.S. PATENT DOCUMENTS

| | | | |
|---|---|---|---|
| 3,575,776 | 4/1971 | MacIntyre | 428/101 |
| 3,577,305 | 5/1971 | Hines et al. | 428/72 |
| 3,966,013 | 6/1976 | Hatch et al. | 428/188 |
| 4,322,462 | 3/1982 | Lucas | 428/127 |
| 4,390,575 | 6/1983 | Hopp | 428/36 |
| 4,401,706 | 8/1983 | Sovilla | 428/166 |
| 4,438,168 | 3/1984 | Testard | 428/192 |
| 4,467,005 | 8/1984 | Pusch et al. | 428/247 |
| 4,486,479 | 12/1984 | Geppert | 428/166 |
| 4,500,578 | 2/1985 | van de Kamp | 428/72 |
| 4,549,323 | 10/1985 | Brockhaus | 428/72 |

FOREIGN PATENT DOCUMENTS 2167710  6/1986  United Kingdom .

Primary Examiner—James J. Bell
Attorney, Agent, or Firm—Woodrow W. Ban

[57] ABSTRACT

Stenciling zone for a radiant heat resistant inflatable structure wherein a surface ply is laminated to structural fabric piles of the structure, leaving a cavity between the surface piles and the structural piles with a spacer element such as aluminum foil being received in the cavity. Stenciling is accomplished over the surface ply and the resultant structure can readily pass FAA standard TSO-69A, Appendix II.

4 Claims, 2 Drawing Figures

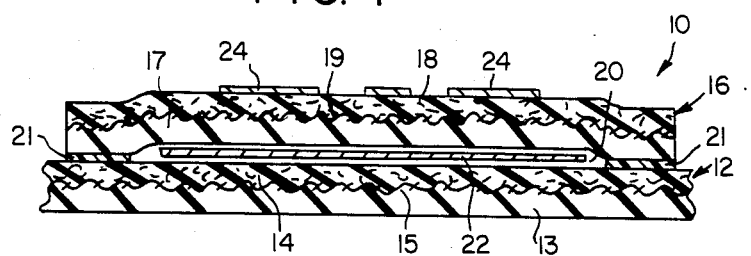
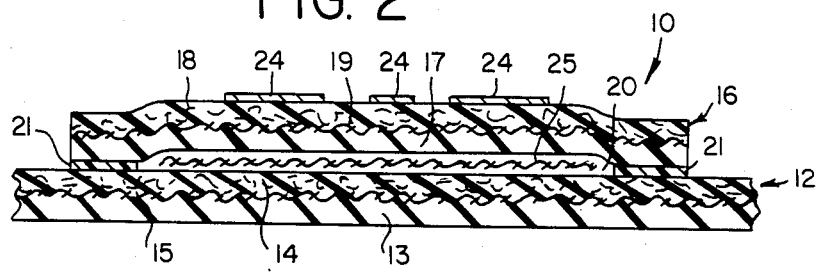

RADIANT HEAT RESISTANT STENCILIBLE INFLATABLE FABRIC AND METHOD

FIELD OF THE INVENTION

The present invention relates to inflatable fabric structures and more particularly to inflatable fabric structures resistant for a desired period of time to an elevated level of radiant heat. More specifically, this invention relates to inflatable aircraft escape slides and to methods and structures for applying stenciling to such escape slides.

BACKGROUND OF THE INVENTION

Inflatables have found use in industry in a wide variety of functions. In some such functions, such as in aircraft escape slides, it is necessary that the inflatable be resistant to substantial quantities of radiant heat for a time period sufficient for the inflatable to perform its intended function. For inflatable evacuation slides such as may be employed in evacuating an aircraft or other escape structure, the time period for which predetermined quantities of radiant heat must be tolerated by the air slide are typically by administrative regulation such as is set forth in Federal Aviation Administration (FAA) regulations and standards, and particularly in FAA/TSO-69A Appendix II. Exposure to intense radient heat can cause deflation as a result of the premature formation of holes.

Traditionally, inflatables are formed of one or more plies of fabric defining an inflatable chamber. An inner surface of the plies of fabric typically is formed of a substance having the properties of retaining air within the inflatable such as a urethane coating or Neoprene ® rubber coating. An outer surface of the inflatable structure typically is coated with an aluminum rich substance, at least where radiant heat resistance is mandated. The resulting aluminum rich coating functions to reflect away a substantial portion of radiant heat impinging upon the inflatable structure and thereby provides protection against the radiant heat. In zones of high wear or great stress, a plurality of fabric plies typically can be employed. Again, the innermost ply includes an inner air retaining urethane layer and the outer surface of the multitude of plies is coated with an aluminum rich substance for radiant heat protection.

Inflatable structures often are employed for emergency evacuation purposes such as in forming evacuation slides for aircraft. It is important in such uses that instructions on such slides be highly visible and easily located as, frequently, these instructions must be read and understood in times of great duress. The point at which such instructions are required varies from inflatable structure to inflatable structure and is in part a function of the use to which the structure is put.

Whether these instructions have been placed on a signage substrate fastened or adhered to the inflatable structure in some manner, or whether these instructions have been stenciled directly onto the inflatable, the application of instructions traditionally has negatively influenced the radiant heat resistance of the inflatable structure. Fastening members employed to fasten a substrate bearing the instructions to the inflatable member have functioned to conduct heat to the inflatable causing premature leakage. The substrates themselves can cause heating of the air inflatable due to the absorption of radiant heat by the substrate and subsequent transfer to the inflatable member and lead to premature inflatable failure.

In past suggestions, the substrate bearing a legend was fixed to the air inflatable and formed from a reflective substance such as aluminum foil. Such reflective substrates can be difficult to adhere to an inflatable and can become damaged during folding of an inflatable for storage.

In past suggestions, where stenciling was applied directly to the inflatable, the ink with which such direct stenciling has been accomplished upon an inflatable has included a substantial proportion of aluminum thereby producing a paint configured to reflect a great amount of radiant heat and slow the process by which radiant heat produces holes and thereby an air loss in the air inflatable. Such aluminum containing paints have proved difficult to view under many lighting conditions and have been less highly visible than would be desired particularly in flickening light such as may result from a fire.

Accordingly, a means for direct stenciling on an inflatable employing highly visible colors while still permitting a radiant heat rejection sufficient to qualify the inflatables for uses such as in escape slides for aircraft could find substantial commercial utility.

SUMMARY OF THE INVENTION

The present invention provides a stenciling zone on an inflatable structure resistant to radiant heat. Such zone comprises at least one ply of a structural fabric having an aluminum coating thereover and a stenciling cover ply also having an aluminum coating thereover. The structural fabric ply and the stenciling cover ply are adhesively bonded along edge portions of the stenciling cover ply and thereby define a cavity between the plies. A spacer element is received in the cavity.

Preferably the spacer element is a ply of aluminum foil. Equally preferably, the spacer element is a fabric mesh characterized by a thermal conductivity of less than about 0.08 BTU/hr/Ft$^2$/° F./Ft and a melting point of at least about 400° C. Typically the spacer ply, where a fabric mesh, is formed of an aromatic polyamide, polyimide or polyaramid.

Radiant heat resistant inflatable structures having a structural fabric ply overlayed with an aluminum coating thereon can be stenciled n accordance with the instant invention by providing a cover ply also having an outer surface having an aluminum coating thereon, providing a spacer element, adhering the cover ply to the structural ply in a manner encapsulating the spacer element between the structural and cover plies thereby defining the cavity between the cover and structural plies, and subsequently stenciling the outer surface of the cover ply. The above and other features and advantages of the instant invention will become more apparent when considered in light of the drawings and a detailed description of a preferred embodiment of the invention that follow, together forming a part of the specification.

DESCRIPTION OF THE DRAWINGS

FIG. 1 is a partial side elevational view in cross section of a stenciling zone in accordance with the invention.

FIG. 2 is a partial side elevational view in cross section of a stenciling zone in accordance with the invention.

BEST EMBODIMENT OF THE INVENTION

Referring to the drawings, FIG. 1 is a depiction in cross sectional partial side elevation of a stenciling zone 10 in accordance with the invention. The stenciling zone 10 includes a structural ply 12 integral to the inflatable structure being stenciled. The structural ply 12 includes a lower surface 13 formed generally of an air impermeable substance such as a urethane or a rubber such as Neoprene ®. Typically, the structural ply 12 includes an outer surface 14 rich in aluminum and configured for reflecting radiant heat. Such aluminized coatings typically are an aluminum filled urethane or other filled binder suitable for integrating the aluminum coating into the structural ply 12. The structural ply 12 includes a fabric reinforcement 15, typically a high melting high strength fabric such as nylon, a polyamide, polyimide or an aromatic polyaramid such as Kevlar ®. The air impervious coating 13 frequently penetrates the fabric mesh 15 to provide a filled or partially filled fabric ply structure.

While suitable or conventional structural plies can be employed, particularly preferred in the practice of the invention is a structural ply formed from four ounce nylon coated on an inner surface with urethane or Neoprene-like rubber having the capability for retaining air in the inflatable, and on the outer surface with an aluminum filled urethane or Neoprene-like rubber. Suitable such fabrics are commercially available.

A surface or cover ply 16 is applied over the structural ply 12. An adhesive bond 21 is employed for joining the surface ply 16 to the structural ply 12. Only edge portions of the cover or surface ply 16 are joined to the structural ply 12.

The surface ply 16 can be of any suitable or conventional configuration having an aluminized heat reflecting outer surface. Typically, however, the surface ply 16 is formed from the same fabric as constitutes the structural ply 12. Therefore, the surface ply 16 typically will include an air impermeable layer 17, an aluminized coating 18, and a fabric reinforcement 19.

The plies 16, 12 define therebetween the cavity 20 a spacer element 22 is received within the cavity 20. In the embodiment of FIG. 1, the spacer element 22 is a sheet of aluminum foil.

Stenciling ink 24 is then applied over the stenciling zone 10 in a desired pattern. The stenciling ink can be of any suitable or conventional nature and such inks are readily commercially available.

Referring to the drawings, FIG. 2 is an alternate preferred embodiment of the invention. In FIGS. 1 and 2, like reference numerals designate identical construction items. In the embodiment of FIG. 2, in lieu of a sheet 22 of aluminum foil as shown in FIG. 1, a fabric mesh 25 is disposed in the cavity 20. The fabric mesh is made of a fabric material having a relatively low thermal conductivity, preferably less than 0.08 BTU/hr/Ft$^2$/° F./Ft. The fabric mesh 25 is possessed of an elevated melting point, preferably in excess of about 400° C. As the fabric mesh may be formed of a polymeric material that has no true melting point at that term is understood in the art, by the term melting point as used herein, what is meant is a softening point or point at which the fabric mesh ceases to have substantial structural integrity.

In accordance with the instant invention, a radiant heat resistant inflatable structure can be stenciled by first providing over a structural ply 12 of the air structure having an aluminumized outer surface 14, a surface ply 16 having an outer surface also having an aluminum coating 18 thereover, providing a spacer element 27, 25, adhering the surface ply 16 to the structural ply 12 in a manner encapsulating the spacer element 22,25 between the structural and surface plies 12, 16 and thereby defining a cavity 20 between the structural and surface plies 12, 16, and finally stenciling the outer surface 18 of the surface ply.

EXAMPLE 1

Two physical specimens of an inflatable structure of the embodiment of FIG. 1 and two physical specimens of the embodiment of FIG. 2 were formed employing structural plies 12 and surface plies 16 formed of 4 ounce nylon fabric having a urethane air barrier and an aluminum filled urethane top coating. The fabric mesh 25 in the embodiments of FIG. 2 was a Kevlar ® aromatic polyaramid mesh; the adhesive employed in bonding the surface and structural plies 12, 16 was a urethane adhesive available from BFGoodrich Company under part No. A1503B.

Separately, an inflatable structure comprising a single thickness of 4 ounce nylon having a urethane inner coating 13 and an aluminized urethane top coating fabric was provided and a separate inflatable structure in accordance with FIG. 1 was provided but not including the aluminum foil spacer element 22. All 6 specimens were stenciled identically and tested pursuant to FAA specification TSO-69A, Appendix II, which requires no air leaks for a period of ninety seconds under exposure to radiant heat at a rate of 1.5 BTU's per square foot per second. The specimens formed in accordance with FIG. 1 survived without air leakage for 600 seconds and 158 seconds respectively; the specimens formed in accordance with FIG. 2 survived without leakage until 90.6 and 85.1 seconds respectively. The single ply structure leaked in approximately 45 seconds and the structure formed in accordance with FIG. 1 but not including an aluminum foil spacer element 22 leaked in approximately 95 seconds.

In order that inflatable structures in accordance with the instant invention be acceptable for use, for example, as radiant heat resistant aircraft escape slides, such structures must meet the requirements of FAA TSO-69A Appendix II. Structures of the instant invention can provide enhanced survival rate for such radiant heat resistant structures without air leakage and can provide an air structure meeting FAA requirements where mere stenciling on ordinary air structures employing inks undiluted by particulate aluminum do not routinely meet such standards.

While a preferred embodiment of the invention has been shown and described in detail, it should be apparent that various modifications may be made thereto without departing from the scope of the claims that follows:

What is claimed is:

1. A stenciling zone of radiant heat resistant inflatable structure comprising: at least one ply of a structural fabric having an aluminum coating thereover; a stenciling surface ply having an aluminum coating thereover; and adhesive bond between edge portions of the surface ply and the structural fabric ply, the structural ply and the surface ply defining therebetween a cavity; and a spacer element received in the cavity.

2. The zone of claim 1, the spacer element being a ply of aluminum foil.

3. The zone of claim 1, the spacer element being a fabric mesh characterized by a thermal conductivity of less than about 0.08 BTU/hr/Ft$^2$/° F./Ft and a melting point of at least about 400° C.

4. The zone of claim 3, the spacer element being an aromatic polyaramid fabric mesh.

* * * * *

UNITED STATES PATENT AND TRADEMARK OFFICE
CERTIFICATE OF CORRECTION

PATENT NO. : 4,719,138

DATED : January 12, 1987

INVENTOR(S) : Lowell William Roemke & Hildreth Wayne Stevenson

It is certified that error appears in the above-identified patent and that said Letters Patent are hereby corrected as shown below:

Column 4, Line 57 - "and" should be --an--.

Signed and Sealed this

Twelfth Day of July, 1988

Attest:

*Attesting Officer*

DONALD J. QUIGG

*Commissioner of Patents and Trademarks*